2,985,666
PROCESS FOR THE MANUFACTURE OF EPOXY COMPOUNDS CONTAINING HYDROXYL GROUPS

Wolfgang Biedermann, Krefeld-Bockum, and Karl Raichle and Hermann Schnell, Krefeld-Uerdingen, Germany, assignors to Farbenfabriken Bayer Aktiengesellschaft, Leverkusen, Germany, a corporation of Germany No Drawing. Filed June 22, 1955, Ser. No. 517,360
Claims priority, application Germany June 25, 1954
4 Claims. (Cl. 260—348)

The object of the present invention is to provide a process for the manufacture of epoxy compounds containing hydroxyl groups from trihydric alcohols whose hydroxyl groups are attached to adjacent carbon atoms.

It has been known that glycidol (2,3-epoxy-1-propanol) may be produced from glycerol by reacting it with cyclic ethylene glycol carbonate.

In contrast to this it has now been found that it is possible to produce in technically advantageous manner epoxy compounds containing hydroxyl groups by converting a trihydric alcohol whose hydroxyl groups are attached to adjacent carbon atoms, i.e. glycerol and its homologues, with a chlorine derivative of carbonic acid such as phosgene or a chlorocarbonic acid ester, to a carbonic acid ester of the trihydric alcohol, and then forming the epoxy ring by splitting off carbon dioxide.

In the process of the invention it is not necessary to produce first ethylene glycol carbonate obtainable only in a technically laborious and complicated way and to isolate it. The smooth formation of, for example, glycidol in good yield, with the aforesaid chlorine derivative of carbonic acid, could not be taken for granted since glycol carbonate hitherto used as the starting material is a cyclic derivative of carbonic acid whereas in the process of the present invention there is employed a non-cyclic derivative of carbonic acid. This is the more surprising since it has been established that non-cyclic diesters of carbonic acid, for example diethyl carbonate, are not suitable.

The conversion may be started at room temperature or at lower or elevated temperature and proceeds in two steps.

When using phosgene as reaction component, the hydrogen chloride is split off in the first step and removed as completely as possible, for example by boiling out or by passing air through the reaction mixture or by combining it with for example pyridine and by subliming the pyridine hydrochloride off below about 120° C. A carbonic acid ester of the polyalcohol is thereby formed.

When reacting the polyalcohol with a chlorocarbonic acid ester, a method which should be exercised in the presence of at least stoichiometric amounts of a tertiary amine, there is first formed, along with the hydrochloride of this tertiary amine, a mixed carbonic acid ester whose one hydroxy component derives from the polyalcohol and the other hydroxy component from the chlorocarbonic acid ester used. In order to complete the conversion, the reaction is finished at a moderately elevated temperature, for example, at about 80–100° C. The hydrochloride of the tertiary amine is then removed from the reaction mixture for example by sublimation below about 120° C. under reduced pressure or by decomposition with non-volatile alkalies. By slowly raising the temperature, for example to 120–140° C., the hydroxy component introduced into the mixed carbonic acid ester by the chlorocarbonic acid ester is liberated again, while a new carbonic acid ester of the polyalcohol is formed, and distilled off, if desired, at reduced pressure.

After the formation of the carbonic acid ester of the polyalcohol either from phosgene or from chlorocarbonic acid, carbon dioxide is split off in a second step after distilling off the solvent which may be present, and the epoxy ring is thus formed. This reaction proceeds at further elevated temperature of between 120 and about 250° C., particularly between about 160 and 220° C. The final product, i.e. the epoxy compound containing hydroxyl groups, is suitably removed from the reaction mixture as it is formed, for example by distillation at normal or reduced pressure. On account of the sensitivity of the epoxy compounds towards acid or alkaline substances, the reaction mixture is suitably neutralized before splitting off the carbon dioxide.

The individual reaction steps may more or less overlap. Particularly good yields are obtained by reacting the trihydric alcohols of the aforesaid kind and the chlorine derivatives of carbonic acid in about stoichiometric amounts. It has already been indicated that it is advantageous to use solvents such as dioxane, tetrahydrofurane or tertiary amines such as for example pyridine or dimethyl aniline, the latter in greater amounts than necessary for binding the liberated hydrogen chloride.

Trihydric alcohols suitable for the process according to the invention are for example glycerol, α-methylglycerol, α-ethylglycerol and β-methylglycerol.

Suitable chlorocarbonic acid esters are those of aliphatic, cycloaliphatic, aromatic or heterocyclic monohydroxy compounds, provided that the boiling point of the corresponding free hydroxy compounds is not higher than about 160° C. at 0.1 mm. Hg pressure. Such esters are for example the methyl, ethyl, propyl, 2-ethyl-n-hexyl, cyclohexyl, phenyl or tetrahydrofurfuryl chlorocarbonic acid ester.

Tertiary amines to be added when using a chlorocarbonic acid ester are for example pyridine or dimethyl aniline.

The following examples are given for the purpose of illustrating the invention.

*Example 1*

Into a mixture of 92 parts by weight of glycerol and 250 parts by volume of dioxane there is run with vigorous stirring a solution of 99 parts by weight of phosgene in 250 parts by volume of dioxane so that the temperature of the reaction mixture at the end of the addition of the phosgene solution is about 60° C. The glycerol slowly dissolves and the reaction mixture becomes homogeneous after brief stirring at 60° C. The mixture is subsequently heated to 80° C. under reflux and air is passed through it until the liberated hydrogen chloride is extensively removed. The last portions are neutralized with anhydrous soda while stirring. After filtration, the solvent is distilled off and the residue is heated to 180–220° C. at a pressure of 10–20 mm. Hg. Carbon dioxide is thereby split off and 65 parts by weight of the crude product are distilled off. After renewed distillation, 44.5 parts by weight of glycidol are obtained which goes over at a pressure of 20 mm. Hg at 77° C. This corresponds to 70% of the theoretical yield, based on reacted glycerol. 13 parts by weight of unreacted glycerol can be recovered.

When proceeding as mentioned above but introducing 140 parts by weight of gaseous phosgene into 92 parts by weight of glycerol without the addition of dioxane at 4–60° C. so that the escaping hydrogen chloride contains as little phosgene as possible, 41 parts by weight of glycidol are obtained.

Example 2

To a mixture of 92 parts by weight of glycerol and 79 parts by weight of pyridine there are added dropwise with stirring at 20–25° C., 108.5 parts by weight of chlorocarbonic acid ethyl ester and the whole is subsequently heated to 100° C. for 2 hours. The pyridine hydrochloride formed is sublimed off under reduced pressure below 120° C. It is thereupon heated to 140° C. while maintaining the reduced pressure whereby the ethanol is distilled off and condensed. The carbon dioxide is finally split off by heating to 160–180° C. At the same time, 42 parts by weight of glycidol are distilled off at a pressure of 20 mm. Hg.

Example 3

To a mixture of 92 parts by weight of glycerol and 79 parts by weight of pyridine there are added dropwise with stirring at 20° C., 192.5 parts by weight of chlorocarbonic acid 2-ethyl-n-hexyl ester and the mixture is further treated as indicated in Example 2. 43 parts by weight of glycidol are obtained.

Example 4

To a mixture of 92 parts by weight of glycerol and 79 parts by weight of pyridine there are added dropwise with stirring at 20° C., 161.5 parts by weight of chlorocarbonic acid cyclohexyl ester and the mixture is further treated as indicated in Example 2. 42 parts by weight of glycidol are obtained.

Example 5

To a mixture of 92 parts by weight of glycerol and 100 parts by weight of pyridine there are added dropwise with stirring at 20° C., 156.5 parts by weight of chlorocarbonic acid phenyl ester and the mixture is further treated as indicated in Example 2. 46 parts by weight of glycidol are obtained.

Example 6

To a mixture of 92 parts by weight of glycerol and 90 parts by weight of pyridine there are added dropwise with stirring at 25° C., 164.5 parts by weight of chlorocarbonic acid tetrahydrofurfuryl ester and the mixture is further treated as indicated in Example 2. 34 parts by weight of glycidol are obtained.

Example 7

To a mixture of 92 parts by weight of glycerol and 360 parts by weight of N,N-dimethylaniline there are added drop by drop at 50° C., 108.5 parts by weight of chlorocarbonic acid ethyl ester, the mixture is stirred for another hour at the above mentioned temperature and heated finally to 95–100° C. under reflux until the reaction mixture has become homogeneous and the reflux of chlorocarbonic acid ethyl ester is finished. A solution of 23 parts by weight of sodium in 300 parts by volume of methanol is then added dropwise to the mixture at 20° C. with stirring whereby the dimethyl aniline converted previously into the hydrochloride is set free again. The dimethyl aniline and the methanol are removed from the reaction mixture at reduced pressure and with stirring at 90° C. The reaction mixture is then heated to 140° C., while maintaining the reduced pressure and further treated as indicated in Example 2. 28 parts by weight of glycidol are obtained.

In these examples the invention is demonstrated by using glycerol as starting material. Instead of glycerol derivatives of this compound such as α-methylglycerol, α-ethylglycerol and β-methylglycerol may be used in a corresponding manner.

We claim:

1. The process of producing an epoxy compound containing a hydroxyl substituent on a carbon atom adjacent to one of the carbon atoms bridged by the epoxy group which comprises the steps of reacting one mol of a trihydric alcohol selected from the group consisting of glycerol, α-methylglycerol, α-ethylglycerol and β-methylglycerol at a temperature of up to about 140° C. with one mol of phosgene and thereby forming a carbonic acid ester of said trihydric alcohol having a free hydroxyl substituent, removing by-product hydrogen chloride, and heating formed carbonic acid ester of the trihydric alcohol at a temperature of up to 250° C. to split off carbon dioxide.

2. The process of claim 1 wherein reaction between trihydric alcohol and phosgene is initiated at room temperature.

3. The process of claim 1 wherein by-product hydrogen chloride is removed at a temperature below about 120° C.

4. The process of claim 1 wherein the reaction is carried out in the presence of a solvent selected from the group consisting of dioxane, tetrahydrofurane, pyridine and dimethyl aniline.

References Cited in the file of this patent

UNITED STATES PATENTS

| | | |
|---|---|---|
| 2,446,145 | Strain | July 27, 1948 |
| 2,511,942 | Prichard | June 20, 1950 |
| 2,522,680 | Kropa | Sept. 19, 1950 |
| 2,636,040 | Bruson | Apr. 21, 1953 |
| 2,667,497 | Cline | Jan. 26, 1954 |
| 2,755,264 | Riedeman | July 17, 1956 |

FOREIGN PATENTS

| | | |
|---|---|---|
| 845,937 | Germany | Aug. 7, 1952 |
| 1,100,845 | France | Apr. 13, 1955 |

OTHER REFERENCES

Allpress: J. Chem. Soc. 125: 2262 (Cyclic Carbonates From Glycerine and Methyl Chlorocarbonate).